United States Patent
Kuphal et al.

(10) Patent No.: US 8,464,967 B2
(45) Date of Patent: Jun. 18, 2013

(54) APPLICATOR BOOM TILT FRAME

(75) Inventors: John Kuphal, Jackson, MN (US); Steve Suebert, Sherbern, MN (US)

(73) Assignee: AGCO Corporation, Duluth, GA (US)

( * ) Notice: Subject to any disclaimer, the term of this patent is extended or adjusted under 35 U.S.C. 154(b) by 705 days.

(21) Appl. No.: 12/636,455

(22) Filed: Dec. 11, 2009

(65) Prior Publication Data

US 2011/0139895 A1  Jun. 16, 2011

(51) Int. Cl.
*B05B 1/20* (2006.01)

(52) U.S. Cl.
USPC ........... 239/168; 239/159; 239/161; 239/172; 172/459

(58) Field of Classification Search
USPC ... 239/159–169, 172; 172/456–459; 414/543, 414/686–689
See application file for complete search history.

(56) References Cited

U.S. PATENT DOCUMENTS

| | | | | |
|---|---|---|---|---|
| 7,703,699 | B2 * | 4/2010 | Hiddema | 239/167 |
| 2009/0173802 | A1 * | 7/2009 | Theeuwen et al. | 239/164 |
| 2010/0219264 | A1 * | 9/2010 | Meyer et al. | 239/164 |

FOREIGN PATENT DOCUMENTS

| | | | |
|---|---|---|---|
| EP | 1832780 A2 | * | 9/2007 |
| GB | 2014834 A | * | 9/1979 |

OTHER PUBLICATIONS

AGCO's Operator's Manual SPRA-COUPE 7450/7650 Liquid System (EFF SN..Sxx1001), front and back coversheets, table of contents, and pp. 5-1 through 5-8 (Dec. 2006).

* cited by examiner

*Primary Examiner* — Jason Boeckmann
(74) *Attorney, Agent, or Firm* — Hovey Williams LLP

(57) ABSTRACT

A tilting boom applicator broadly includes a laterally-extending applicator boom a lift, and a tilt frame. The lift includes upper and lower lift arms that support the applicator boom and are operable to vertically shift the applicator boom. The tilt frame interconnects the applicator boom and lift and includes a fixed section mounted to upper lift arms and a swinging section mounted to the applicator boom. The frame sections are attached to each other at a frame pivot joint that defines a longitudinal tilt axis, with the frame pivot joint permitting tilting movement of the applicator boom relative to the lift about the longitudinal tilt axis. Lower lift arms are directly attached to the swinging section to limit movement of the applicator boom relative to the lift about a lateral pitch axis while permitting the tilting movement.

27 Claims, 12 Drawing Sheets

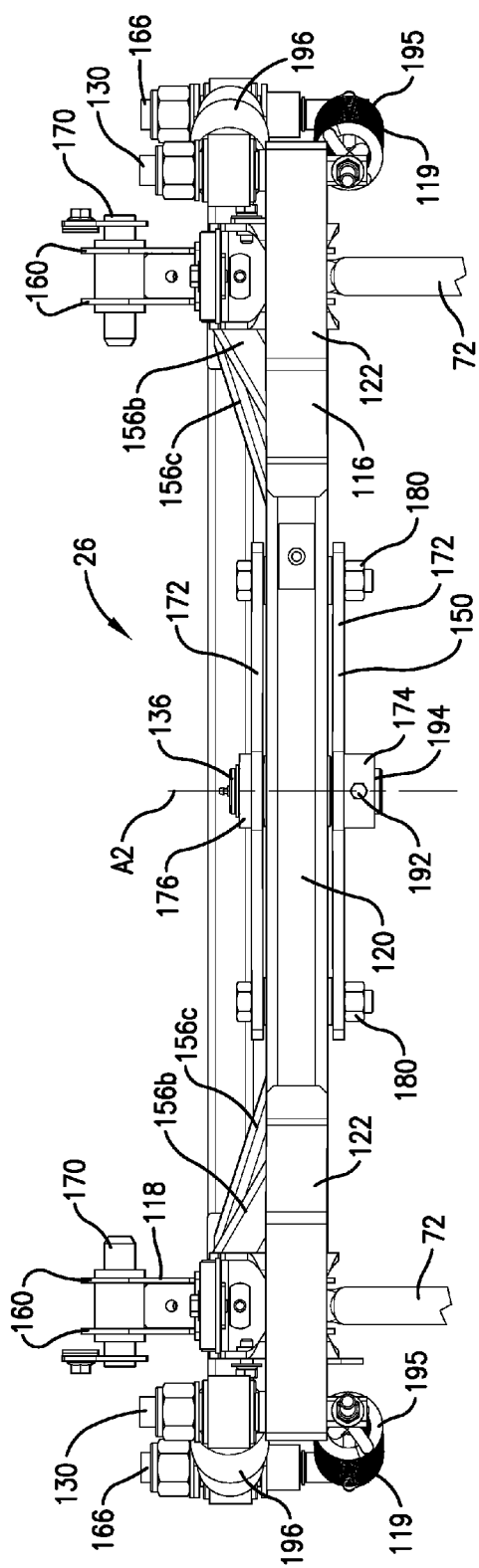
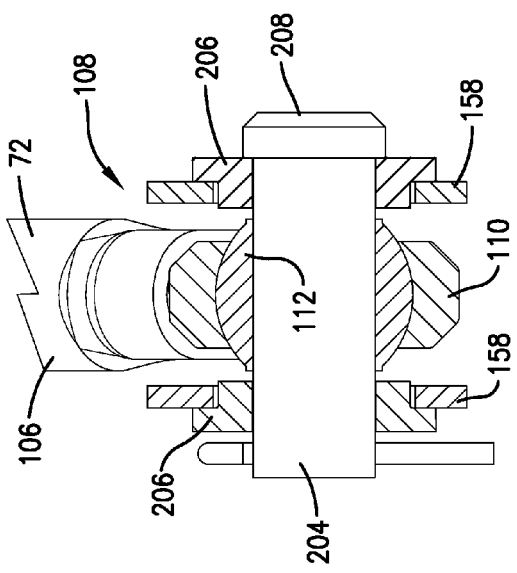

APPLICATOR BOOM TILT FRAME

BACKGROUND

1. Field

The present invention relates generally to agricultural boom applicators. More specifically, embodiments of the present invention concern an applicator assembly with a tilt frame that permits tilting of an applicator boom.

2. Discussion of Prior Art

Boom applicators are used in agricultural applications to apply chemicals, such as pesticides, herbicides, or fertilizers, to a field. Prior art boom applicators include a boom assembly with a pair of booms that are supported by and extend laterally in opposite directions from a vehicle. The booms support equipment for discharging material at predetermined locations along the width of the boom assembly (e.g., a spray applicator that includes high pressure lines and nozzles mounted on the booms). Prior art boom applicators also include mechanisms that allow the boom assembly to tilt about a longitudinal axis (e.g., fore-and-aft axis) of the applicator and relative to the vehicle, particularly when traveling over uneven ground.

Prior art boom applicators are deficient and suffer from various undesirable limitations. For example, conventional boom applicators that permit tilting movement of the boom assembly are excessively heavy. The weight of prior art boom assemblies can cause damage to the booms or to another part of the applicator during conventional spraying operations, particularly when spraying is conducted over undulating terrain. Furthermore, conventional boom applicators generally support the boom assembly in a cantilevered configuration, with the weight of the booms located at an undesirable longitudinal distance from the vehicle. The conventional cantilevered support designs also promote a supporting structure that is unduly heavy.

SUMMARY

Embodiments of the present invention provide a tilting boom applicator that does not suffer from the problems and limitations of the prior art applicators set forth above.

A first aspect of the present invention concerns a tilting boom applicator that broadly includes a laterally-extending applicator boom, a lift, and a tilt frame. The lift supports the applicator boom and is operable to vertically shift the applicator boom. The lift includes a first lift arm and a second lift arm extending longitudinally relative to the applicator boom. The tilt frame interconnects the applicator boom and lift. The tilt frame includes a first frame section mounted to the first lift arm and a second frame section mounted to the applicator boom. The first and second frame sections are attached to each other at a frame pivot joint that defines a longitudinal tilt axis, with the frame pivot joint permitting tilting movement of the applicator boom relative to the lift about the longitudinal tilt axis. The second lift arm is directly attached to the second frame section and serves to limit movement of the applicator boom relative to the lift about a lateral pitch axis while permitting the tilting movement.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 11 is a fragmentary top view of the tilting boom sprayer shown in FIGS. 1-10, showing the tilt frame in the untilted frame position, and partly showing the lower lift arms pivotally attached to the tilt frame;

FIG. 13 is a cross section of the tilt frame taken along line 13-13 in FIG. 10.

Figure 1:
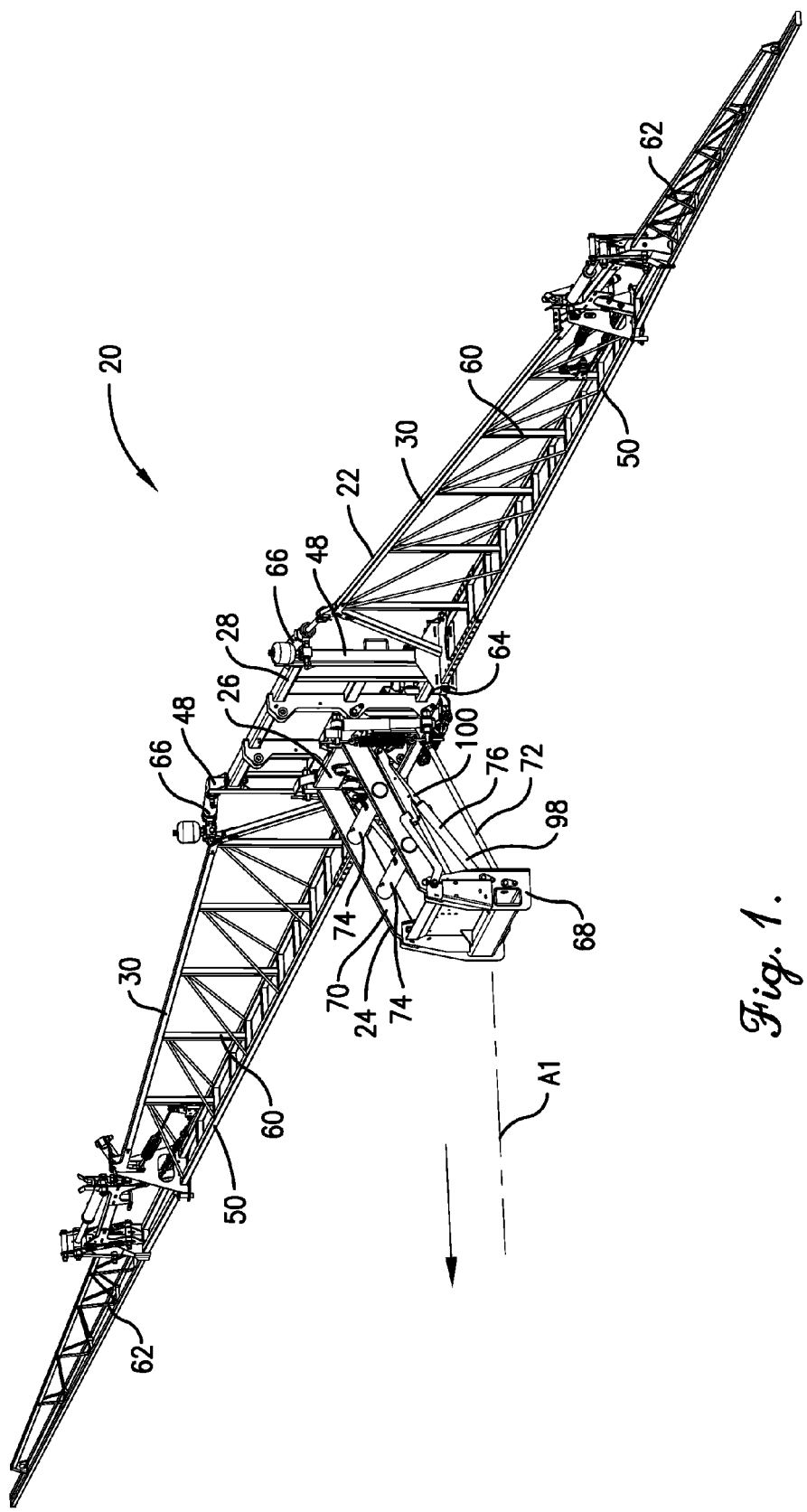
FIG. 1 is a front perspective of a tilting boom sprayer constructed in accordance with a preferred embodiment of the present invention and broadly including a boom assembly, a lift assembly, and a tilt frame, and showing the lift assembly in an upper lift position.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Turning initially to FIG. 1, a tilting boom sprayer 20 is mounted on a vehicle (not shown) for applying material. In particular, the illustrated sprayer 20 is useful in agricultural spraying applications such as applying various material (e.g., liquid or dry chemicals) to a crop field. The sprayer 20 is preferably configured to be mounted to a self-propelled vehicle (e.g., a tractor or truck) for travel in a forward direction (indicated by the arrow in FIG. 1) along longitudinal axis A1 of the sprayer 20. However, is also within the scope of the present invention where the sprayer 20 is mounted to a towed vehicle (e.g., a wheeled trailer). While the illustrated sprayer 20 is configured as a liquid spraying applicator it is also in the scope of the present invention where the sprayer 20 comprises another type of liquid applicator or comprises another type of applicator such as a granular chemical applicator. The tilting boom sprayer 20 broadly includes a sprayer boom assembly 22, a sprayer lift assembly 24, and a tilt frame 26. As will be discussed further, the sprayer 20 is mounted such that the lift assembly 24 is preferably positioned forwardly of the boom assembly 22, with the boom assembly 22 extending in a lateral direction. However, the principles of the present invention are applicable where the lift assembly 24 is positioned rearwardly of the boom assembly 22 (e.g., where the sprayer 20 is mounted to the front of a vehicle).

Figure 2:
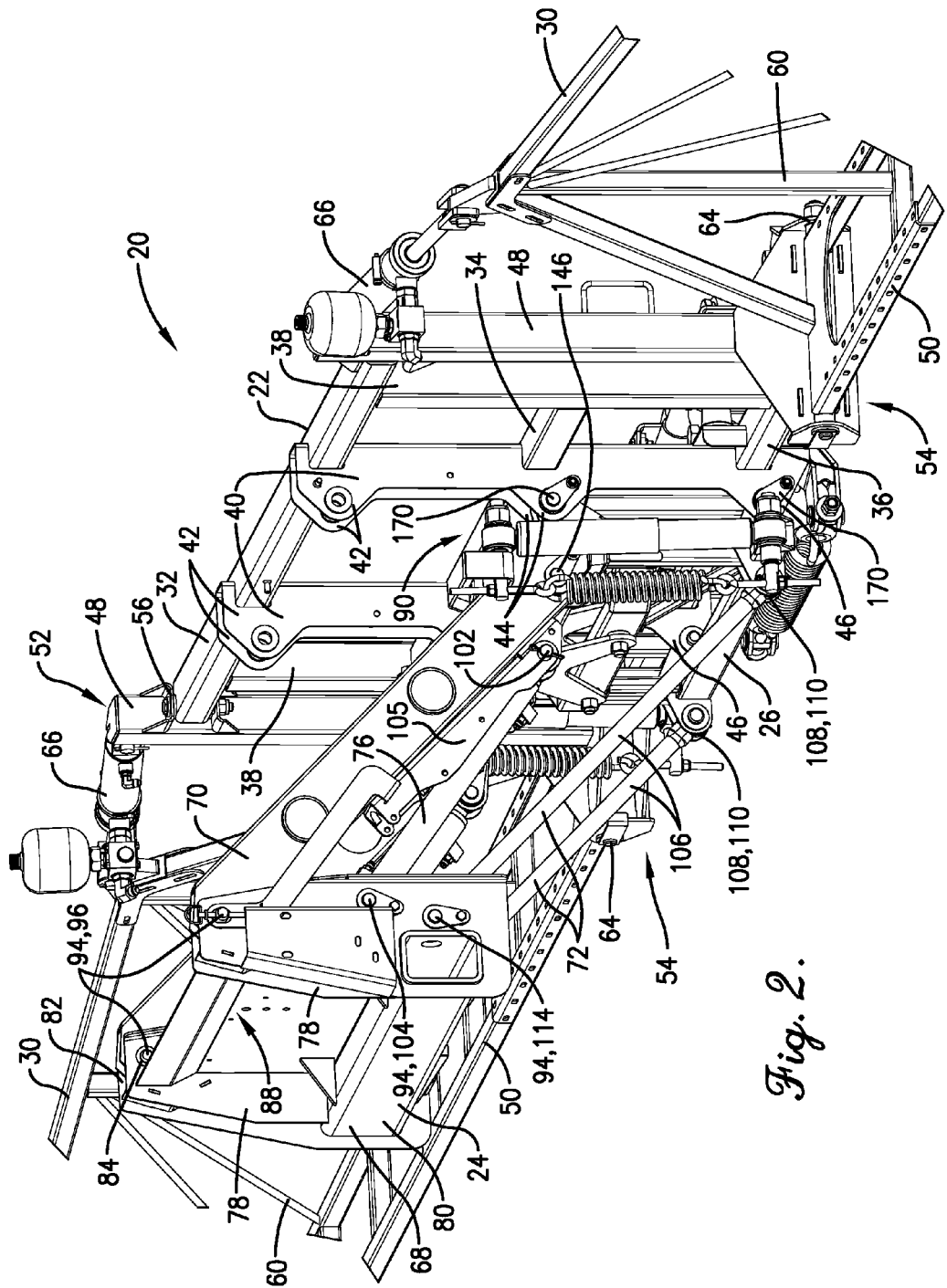
FIG. 2 is a fragmentary front perspective of the tilting boom sprayer shown in FIG. 1, showing the base, upper lift arms, lower lift arms, and lift cylinders of the lift assembly, with the lift assembly in a lower lift position.
Figure 3:
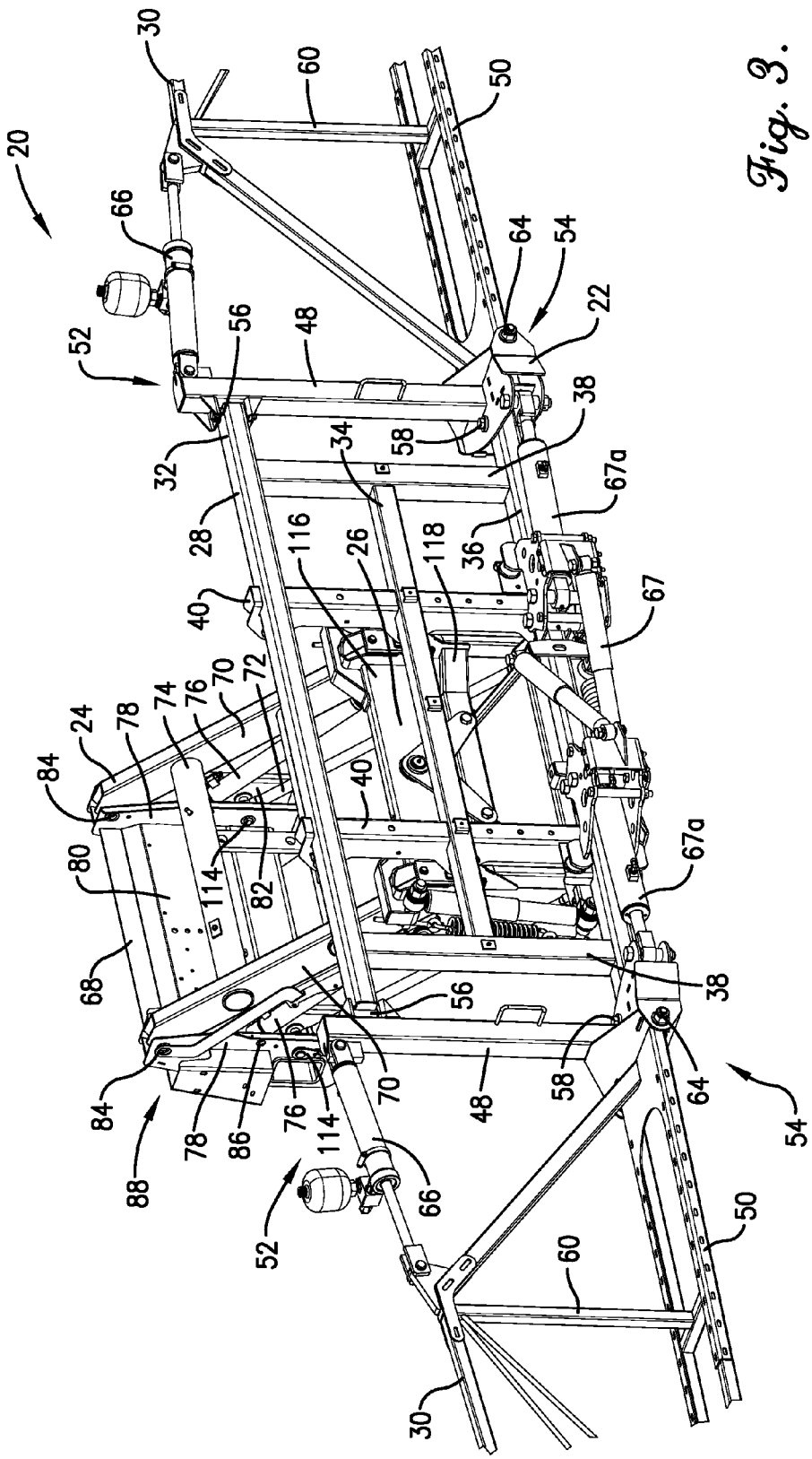
FIG. 3 is a fragmentary rear perspective of the tilting boom sprayer shown in FIGS. 1 and 2, showing the tilt frame positioned between and interconnecting the lift assembly and the boom assembly, with the lift assembly in the lower lift position.

Turning to FIGS. 1-3, the illustrated boom assembly 22 serves to support pressurized sprayer equipment (not shown) including a plurality of pressure lines and nozzles. Pressurized spray nozzles are positioned at predetermined, laterally spaced locations (not shown) to provide a desired pattern of coverage. The boom assembly 22 broadly includes a central boom support frame 28 and booms 30 spaced on opposite sides of the support frame 28. The illustrated support frame 28 preferably comprises a rigid weldment and includes lateral members 32,34,36 and upright end members 38 spaced adjacent opposite ends of the support frame 28. The support frame 28 also includes a pair of upright connector members 40 spaced between the end members 38 and interconnecting the lateral members 32,34,36. The connector members 40 each comprise channel shaped sections that present an elongated slot and include upper, intermediate, and lower lugs 42,44,46 on opposite sides of the slot. The lugs 42,44,46 present corresponding openings, with the lugs 42,44,46 serving as attachment locations so that the support frame 28 can be removably attached to the tilt frame 26. However, the principles of the present invention are equally applicable where the support frame 28 is alternatively configured for removable attachment to the tilt frame 26 and to support the booms 30.

The booms 30 extend laterally from the support frame 28 and broadly include an upright post 48 and truss assembly 50. The upright post 48 is elongated and presents upper and lower ends 52,54. The upright post 48 is pivotally attached to the support frame 28 adjacent the ends 52,54 at upper and lower boom pivot joints 56,58. As will be discussed, the illustrated boom pivot joints 56,58 permit pivotal movement of the booms 30 relative to the support frame 28 about respective vertical boom pivot axes.

The truss assembly 50 comprises a pair of inboard and outboard truss frames 60,62 attached end to end and foldable relative to each other. However, it is also within the scope of the present invention where the truss assembly 50 is alternatively configured, e.g., where the truss assembly 50 comprises a single rigid frame. The truss assembly 50 is pivotally attached to the upright post 48 at a boom tilt joint 64 adjacent an inboard truss end. The illustrated boom tilt joint 64 is also preferably located adjacent the lower end 54 of upright post 48. With the booms 30 in an unfolded operating position (see FIG. 1), the illustrated booms 30 and support frame 28 preferably present a total boom width of the sprayer 20 (measured from one outboard end of one truss assembly 50 to the outboard end of the other truss assembly 50) that preferably ranges from about twenty (20) feet to about one hundred fifty (150) feet. More preferably, the boom width ranges from about fifty (50) feet to about one hundred (100) feet and, most preferably, the boom width is about ninety (90) feet.

The boom assembly 22 also includes a pair of boom tilt cylinders 66 each pivotally attached to a corresponding upright post 48 adjacent the upper end 52 and also attached pivotally to the corresponding truss frame 60 adjacent the inboard end of the truss assembly 50. The illustrated cylinder 66 controls tilting movement of the truss assembly 50 relative to the support frame 28 about a generally horizontal axis. The boom assembly 22 further includes a boom pivot mechanism 67 that interconnects the booms 30 and the support frame 28. The boom pivot mechanism 67 includes hydraulic cylinders 67a, springs, and dampers mounted rearwardly of the support frame 28, with cylinder pistons pivotally attached to corresponding inboard truss frames 60. The hydraulic cylinders 67a of boom pivot mechanism 67 are operable to pivot the booms 30 relative to the support frame 28 about respective vertical boom pivot axes (see FIG. 3).

Again, the illustrated booms 30 and support frame 28 are configured to support pressure lines and nozzles (not shown) at predetermined spaced locations along a lateral direction. However, it is within the ambit of the present invention where the booms 30 and support frame 28 are alternatively constructed to support the pressure lines and nozzles. In use, the booms 30 extend laterally during operation of the sprayer 20 and are shiftable relative to the support frame 28 about the vertical boom pivot axes. In particular, the pivot mechanism 67 can shift the booms 30 out of the unfolded operating position (see FIG. 1) by pivoting the truss assemblies 50 forwardly into a folded storage position (not shown). In the folded storage position, the truss assemblies 50 extend substantially parallel to longitudinal axis A1 of the sprayer 20. Similarly, pivot mechanism 67 can shift the booms 30 rearwardly from the folded storage position into the unfolded operating position to permit use of the sprayer 20.

Turning to FIGS. 2-8, the lift assembly 24 is operable to support and selectively position the boom assembly 22 relative to the ground (not shown) by shifting the boom assembly 22 along a vertical direction. The lift assembly broadly includes a base 68, upper and lower lift arms 70,72, braces 74, and arm lift cylinders 76. The base 68 is conventional and includes a pair of upright channel sections 78 and a base frame 80 that rigidly interconnects the upright channel sections 78. Each channel section 78 presents a rearwardly facing slot 82 configured to receive upper and lower lift arms 70,72. The channel section 78 also presents openings 84 that serve as arm attachment locations (see FIGS. 2 and 3). Furthermore, the channel section 78 presents intermediate openings 86 spaced vertically between openings 84, with the openings 86 configured for pivotal connection of the channel section 78 to corresponding arm lift cylinders 76 (see FIG. 3).

Figure 4:
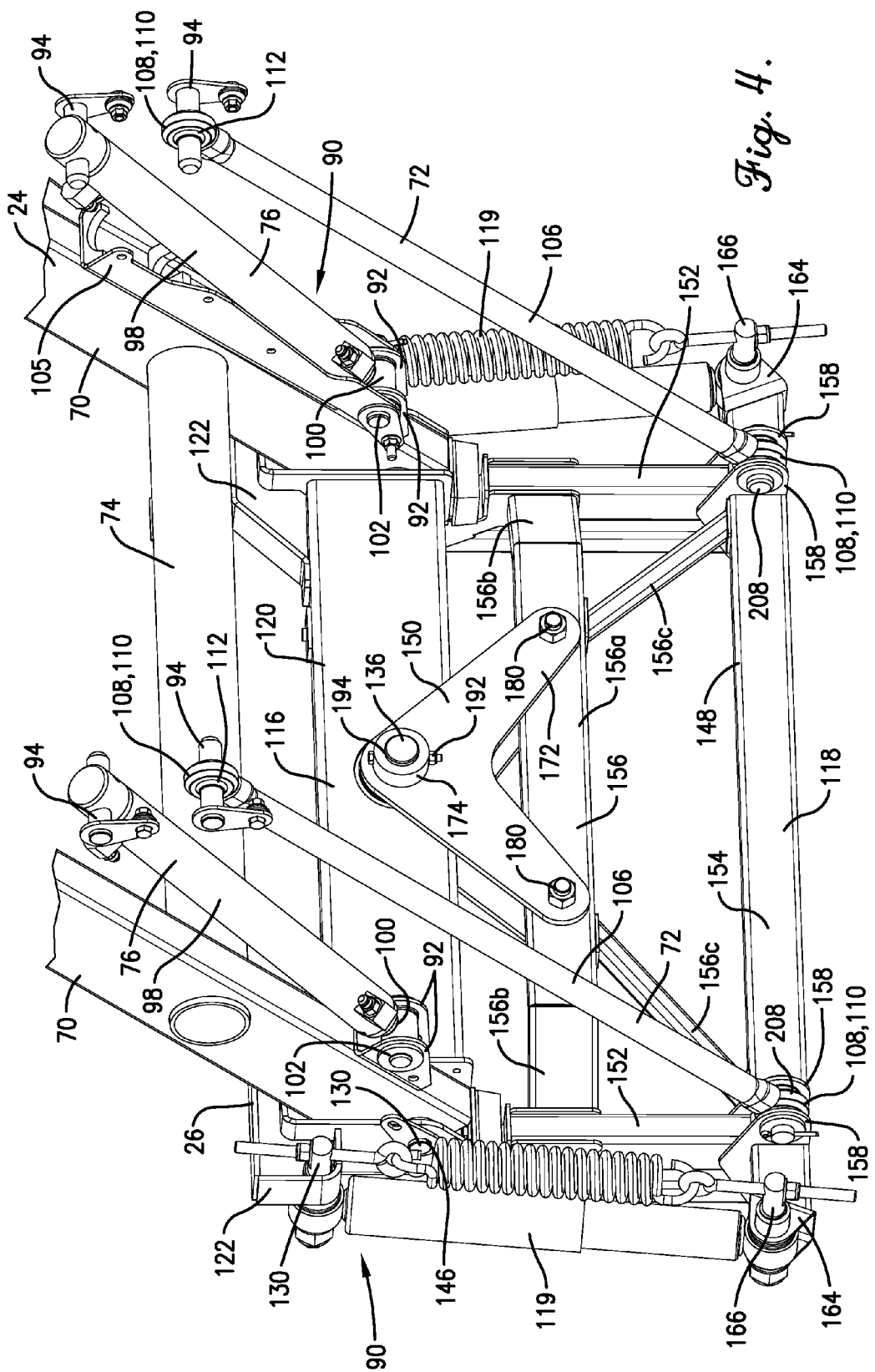
FIG. 4 is an enlarged fragmentary front perspective of the lift assembly and tilt frame shown in FIGS. 1-3, showing a fixed section of the tilt frame attached to the upper lift arms and a swinging section of the tilt frame attached to the lower lift arms.
Figure 5:
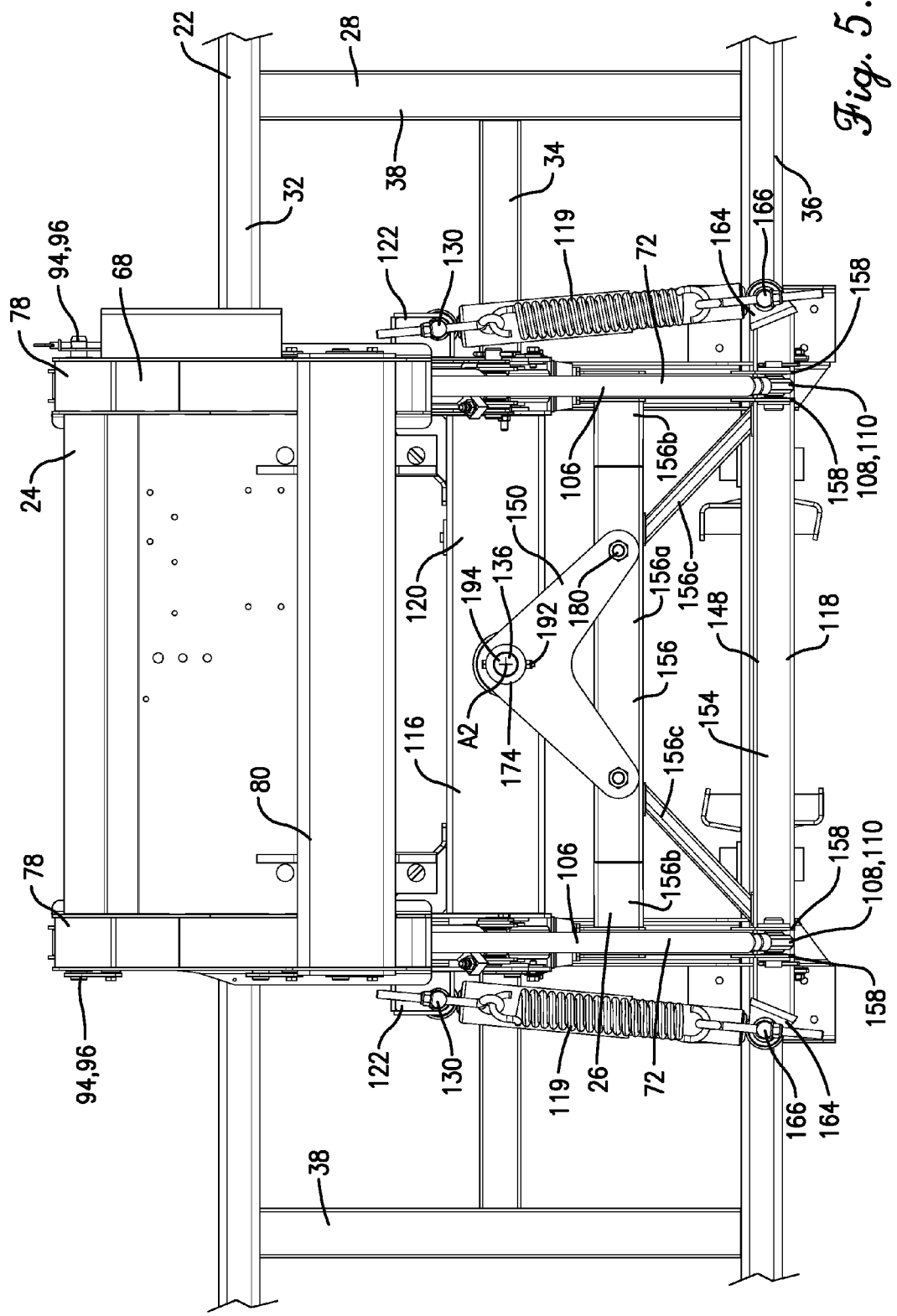
FIG. 5 is a fragmentary front elevation of the tilting boom sprayer shown in FIGS. 1-3, showing the fixed and swinging sections of the tilt frame in an untilted frame position, with the boom assembly in a corresponding untilted boom orientation.
Figure 6:
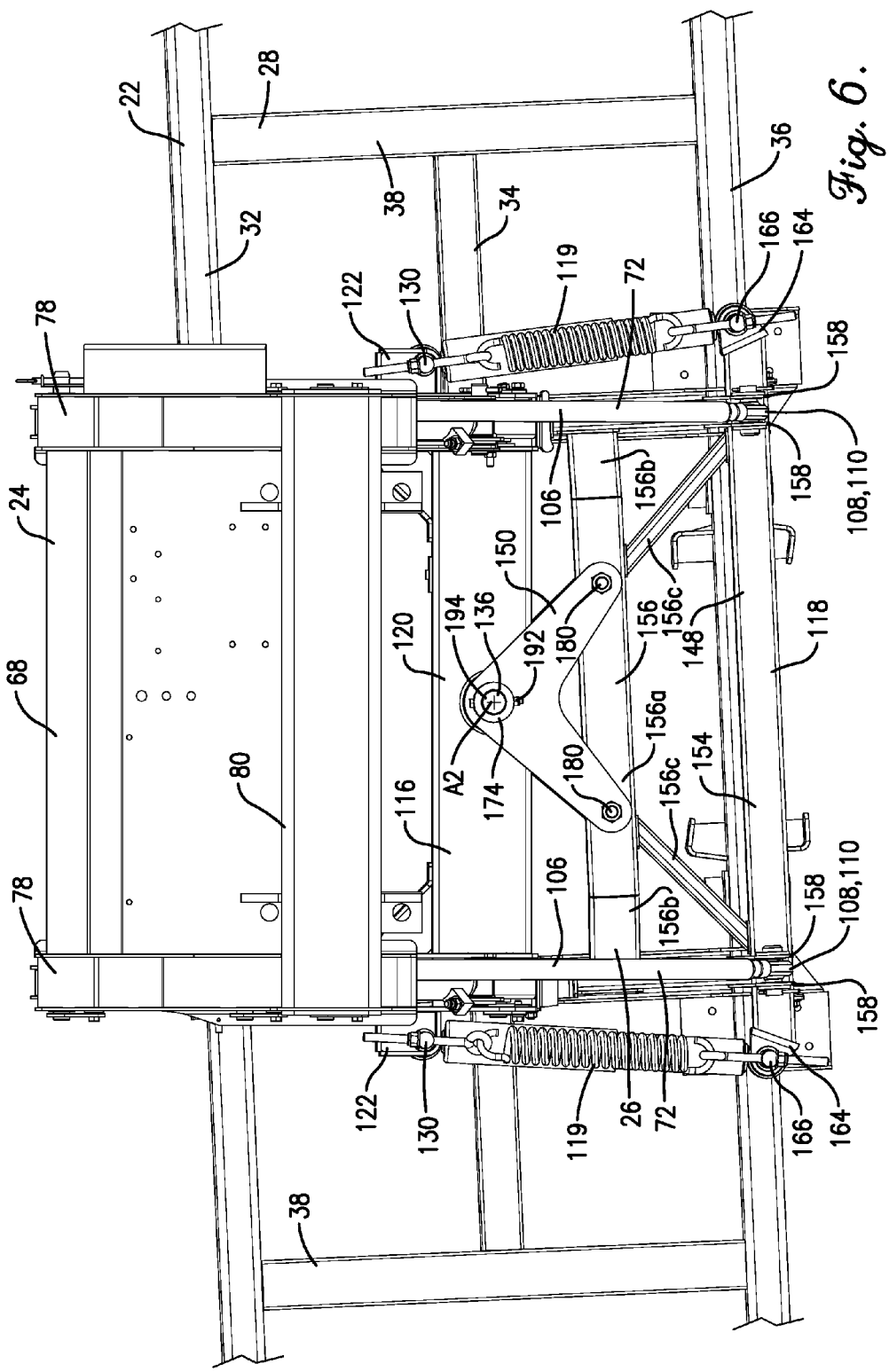
FIG. 6 is a fragmentary front elevation of the tilting boom sprayer shown in FIGS. 1-3 and 5, showing the fixed and swinging sections of the tilt frame in a tilted frame position, with the boom assembly in a corresponding tilted boom orientation.
Figure 7:
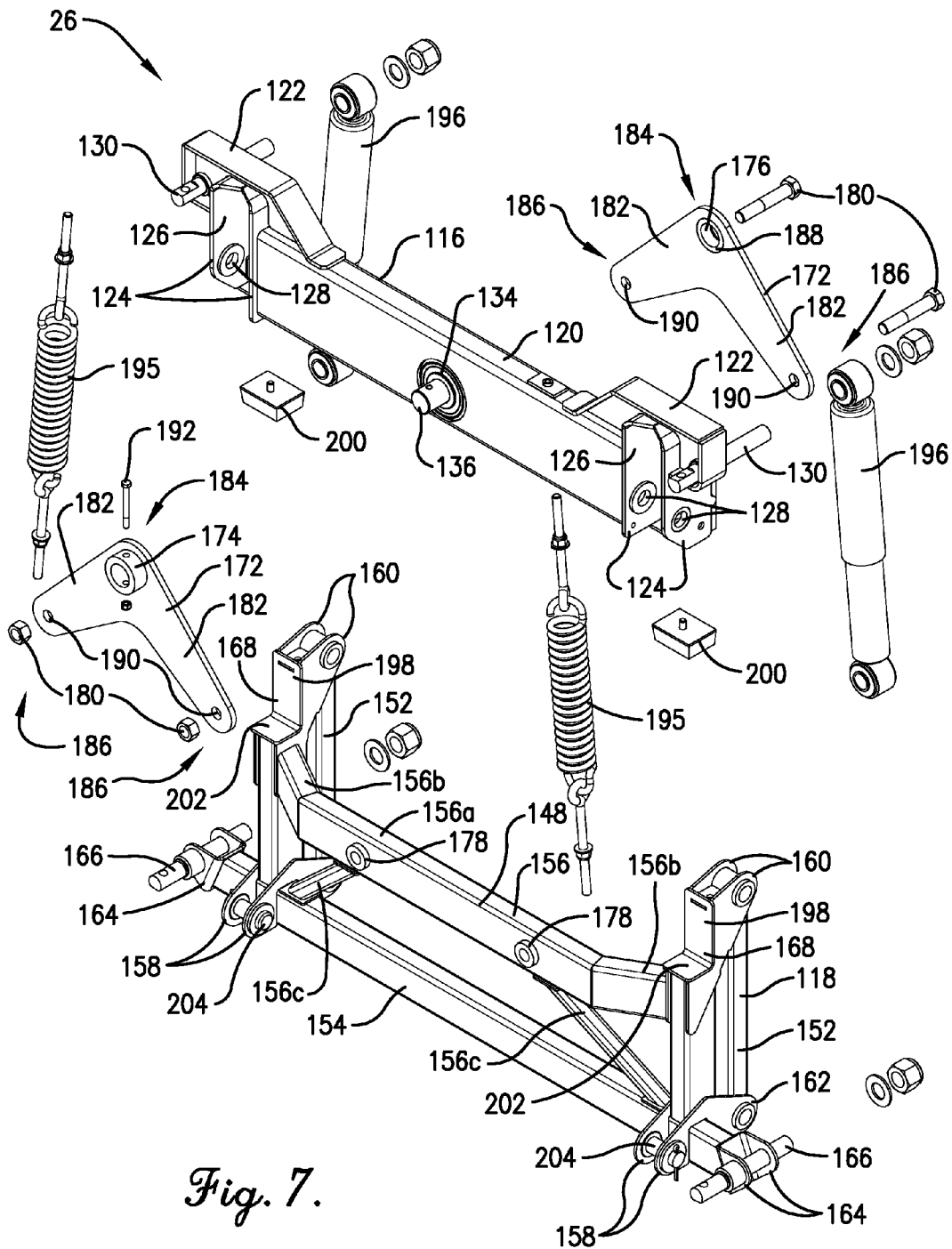
FIG. 7 is an exploded perspective of the tilt frame shown in FIGS. 1-6, showing the fixed and swinging sections and spring-and-damper assemblies of the tilt frame.
Figure 8:
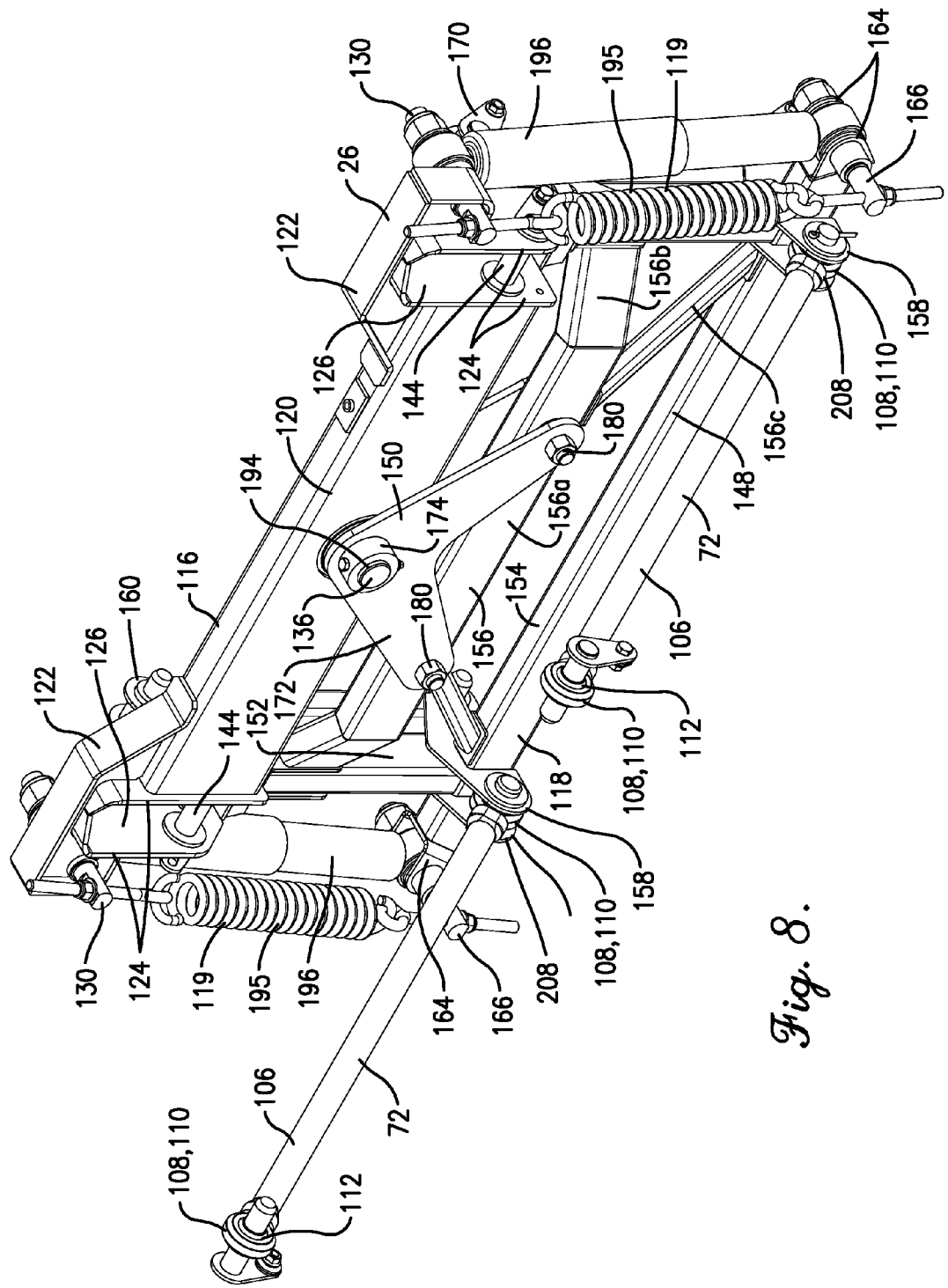
FIG. 8 is a fragmentary front perspective view of the tilting boom sprayer shown in FIGS. 1-3 and 5-6, showing the tilt frame and the lower lift arms pivotally attached to the tilt frame at ball pivot joints.
Figure 9:
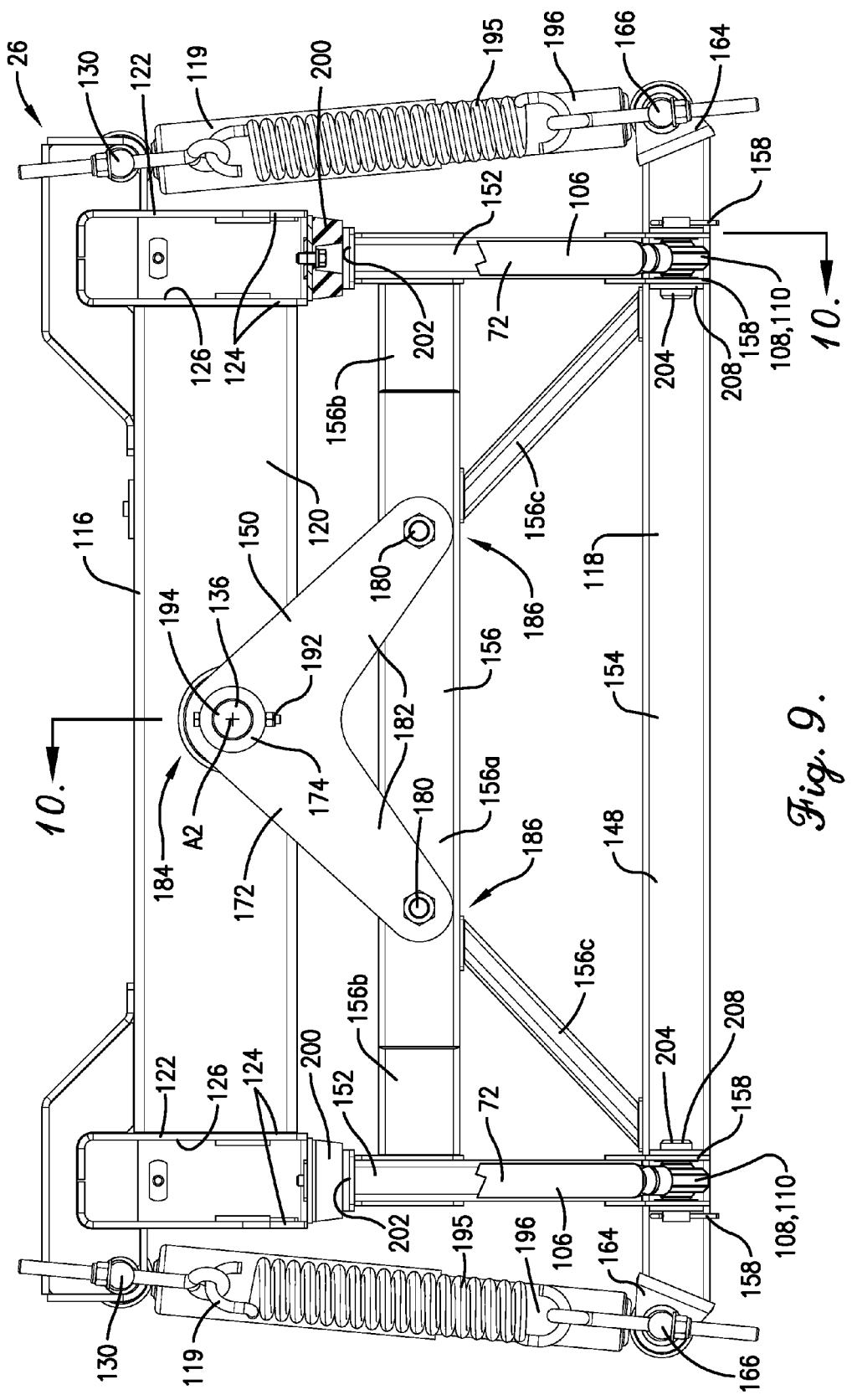
FIG. 9 is a fragmentary front elevation of the tilting boom sprayer shown in FIGS. 1-8, showing the tilt frame in the untilted frame position and partly showing the lower lift arms pivotally attached to the tilt frame.

Turning to FIGS. 2-4, upper lift arms 70 comprise elongated tubular beams and present fore ends 88 (see FIGS. 2 and 3) and aft ends 90 (see FIGS. 2 and 4). The upper lift arms 70 extend longitudinally and are spaced side by side. The arms 70 are rigidly connected by the tubular braces 74, which extend laterally between the arms 70 and are spaced longitudinally between the fore and aft ends 88,90. The illustrated braces 74 and upper lift arms 70 cooperatively form a rigid weldment. While the illustrated arms 70 preferably present a fixed length, it is also within the scope of the present invention where arms 70 have an adjustable length. The upper lift arms 70 also include lower lugs 92 positioned adjacent the aft end 90 and attached to a lower surface of the tubular beam (see FIG. 4). The upper lift arms 70 are pivotally attached to the base 68 by inserting the fore ends 88 into corresponding slots 82 and inserting pins 94 through openings 84 in the channel section 78 and through corresponding openings in the fore end 88, with the upper lift arms 70 and base 68 cooperatively forming upper base pivot joints 96.

Turning to FIGS. 2-4, the arm lift cylinders 76 comprise conventional hydraulic cylinders and each broadly includes a cylinder housing 98 and piston 100. The lift cylinders 76 are each attached to the corresponding upper lift arm 70 by attaching an aft end of the piston 100 to the lower lug 92 at a piston pivot joint 102 (see FIG. 4). The cylinders 76 are also attached to the base 68 by attaching a fore end of the cylinder housing 98 within the corresponding slot 82 of the channel section 78. The fore end of the cylinder housing 98 is attached by extending a pin 94 through intermediate opening 86 and through the fore end of the cylinder housing 98, with the cylinder housing 98 and the base 68 cooperatively forming a cylinder pivot joint 104 (see FIG. 2).

Thus, the cylinders 76 connect the upper lift arms 70 to the base 68, and are operable to shift the upper lift arms 70 relative to the base 68. As each cylinder 76 moves the piston 100 in and out of the cylinder housing 98 between extended and retracted cylinder configurations, the piston 100 causes corresponding vertical movement (i.e., downward movement and upward movement) of the upper lift arm 70 relative to the base 68. Preferably, the illustrated cylinders 76 are configured to move the pistons 100 at the same time so that the upper lift arms 70 move with one another.

The lift assembly 24 also includes an elongated chock 105 pivotally mounted to the left-hand piston pivot joint 102 (see FIG. 4). The chock 105 is positioned between the left-hand upper lift arm 70 and the cylinder 76 and is operable to pivot downwardly into engagement with an aft end of the cylinder housing 98 to selectively lock the cylinder 76 into the extended cylinder configuration. While the illustrated lift assembly 24 preferably includes a pair of cylinders 76 that cooperatively move the upper lift arms 70, it is also within the scope of the present invention where an alternative number or configuration of cylinders are used to control movement of the upper lift arms 70. Furthermore, it is also within the scope of the present invention where the lift assembly 24 includes a powered mechanism other than the illustrated hydraulic cylinder arrangement for lifting and lowering the lift arms 72,74, the tilt frame 26, and boom assembly 22.

Turning again to FIGS. 2-4, lower lift arm 72 includes an elongated member 106 and oppositely spaced ball bearing assemblies 108 mounted to corresponding ends of the elongated member 106. The illustrated lift arm 72 preferably presents a fixed length, but it is also within the ambit of the present invention where lift arm 72 has an adjustable length. The ball bearing assembly 108 includes a housing 110 with a cage (not shown), and a spherical sleeve 112 mounted in the housing 110 (see FIG. 13). The lower lift arms 72 are pivotally attached to the base 68 at a lower base pivot joint 114 by inserting pins 94 through corresponding openings 84 and through an opening presented by the spherical sleeve 112, with the lower base pivot joint 114 permitting relative pivotal movement between the lower lift arms 72 and base 68 about a lateral pitch axis and about a vertical arm pivot axis. In this manner, the lower base pivot joint 114 permits relative up and down pivotal movement of the lower lift arm 72 relative to the base 68 and also a limited amount of lateral pivotal movement of the lower lift arm 72 relative to the base 68.

Turning to FIGS. 4-13, the tilt frame 26 serves to interconnect the lift assembly 24 and the boom assembly 22. Furthermore, the tilt frame 26 permits relative tilting movement between the lift assembly 24 and the boom assembly 22 and dampens movement of the boom assembly 22 relative to the lift assembly 24, as will be discussed in greater detail. The illustrated tilt frame 26 broadly includes a fixed section 116, a swinging section 118 operable to tilt relative to the fixed section 116, and spring-and-damper assemblies 119 extending between the sections 116,118.

Turning to FIGS. 7-13, the fixed section 116 serves to interconnect aft ends 90 of the upper lift arms 70. The fixed section 116 includes a tubular body 120 and opposite arm mounting brackets 122 rigidly attached to corresponding ends of the body 120. The illustrated body 120 and brackets 122 preferably comprise a weldment, however it is also within the scope of the present invention where the fixed section 116 is alternatively constructed. The arm mounting brackets 122 each include pairs of adjacent upper arm lugs 124 that cooperatively present corresponding slots 126 and openings 128. The mounting brackets 122 also include upper mounting pins 130 that are positioned outboard of the adjacent lug 124 to support the spring-and-damper assemblies 119. The body 120 also presents a longitudinal opening 132 that is generally centered along the length of the body 120 and receives a bushing assembly 134 of the fixed section 116 along with a pin 136 (see FIG. 10).

Figure 10:
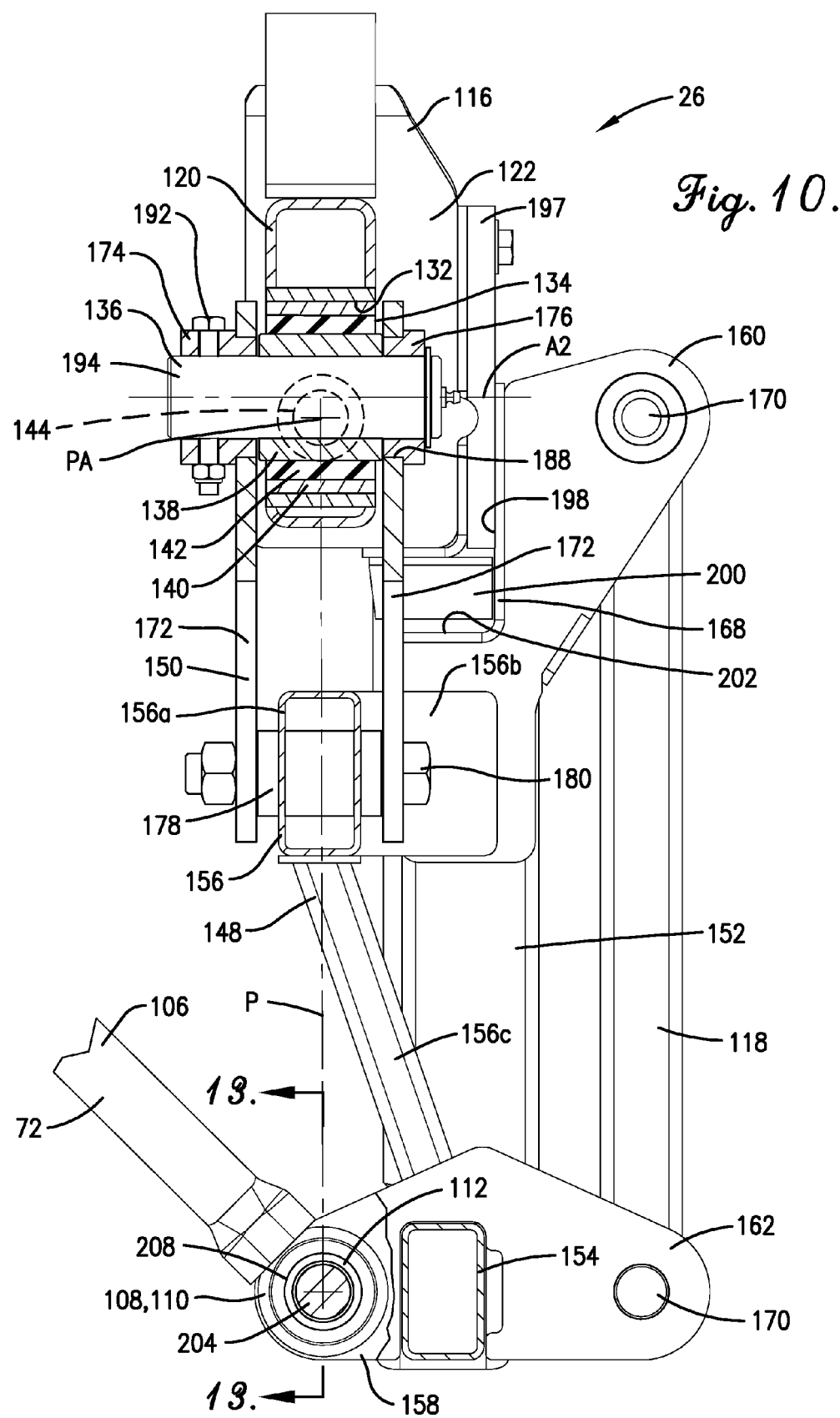
FIG. 10 is a fragmentary cross section of the tilting boom sprayer taken along line 10-10 in FIG. 9.
Figure 12:
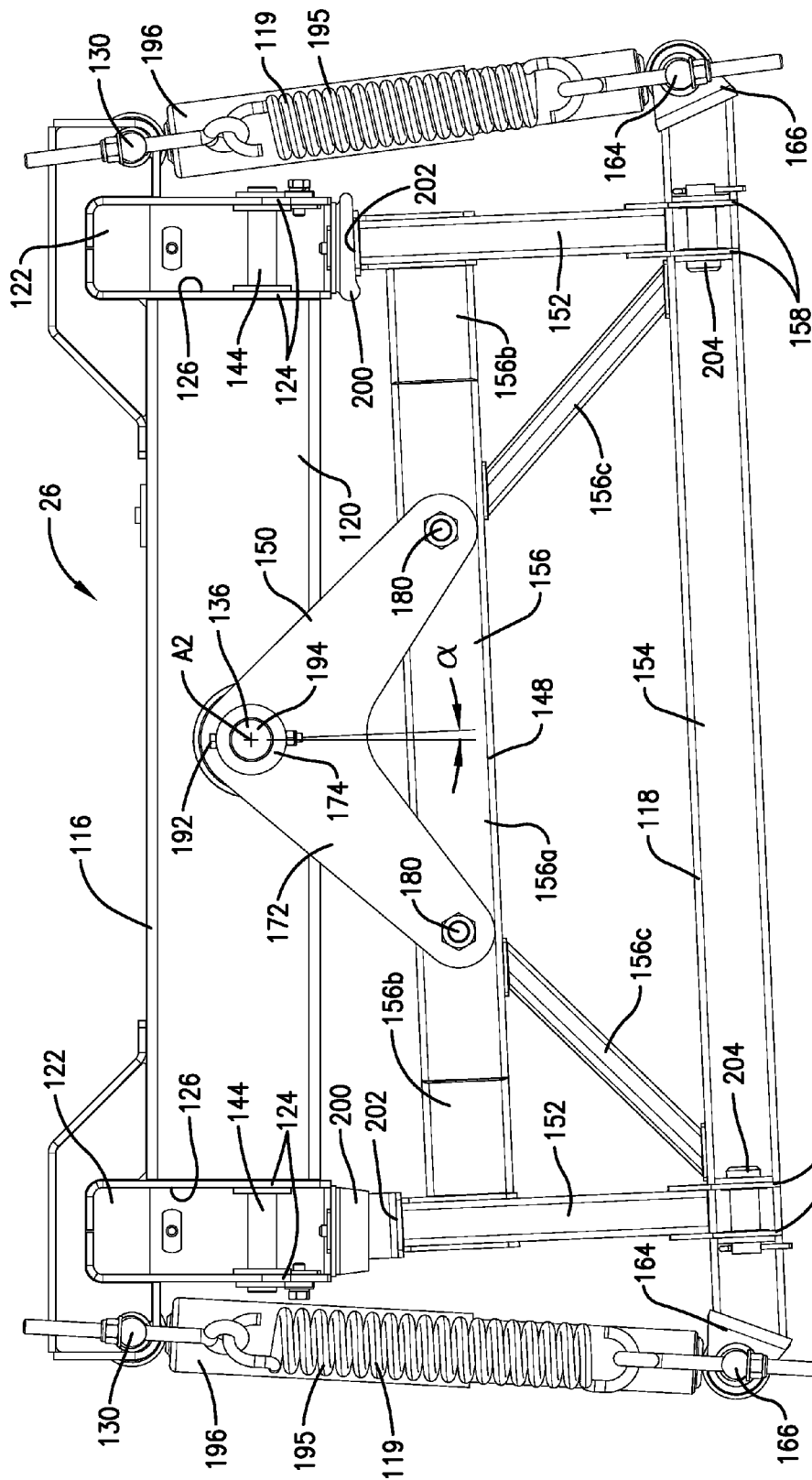
FIG. 12 is a front elevation of the tilt frame shown in FIGS. 1-11, showing the tilt frame in the tilted frame position.

The illustrated bushing assembly 134 includes inner and outer metal sleeves 138,140 and an intermediate elastomeric sleeve 142 (see FIG. 10). The illustrated elastomeric sleeve 142 preferably comprises an elastomeric compound (e.g., nitrile rubber) but could include other types of compounds without departing from the scope of the invention. The sleeves 138,140,142 are preferably joined to form a unitary assembly, with the elastomeric sleeve 142 permitting relative movement between the metal sleeves 138,140. In particular, the elastomeric sleeve 142 is configured to permit relative off-axis movement between metal sleeves 138,140 about a lateral pitch axis PA, as will be discussed in greater detail (see FIG. 10). It is also within the scope of the present invention wherein the bushing assembly 134 is alternatively constructed to provide relative movement between inner and outer metal sleeves 138,140. For example, the bushing assembly 134 could include a ball joint to permit off-axis pivotal movement.

The fixed section 116 is attached to the upper lift arms 70 by inserting aft ends 90 into slots 126 of upper arm lugs 124. The fixed section 116 is then pivotally attached by extending pins 144 through openings 128 and through corresponding openings in the aft ends 90. Thus, the fixed section 116 and upper lift arms 70 cooperatively provide upper arm pivot joints 146 that permit relative pivotal movement between the fixed section 116 and the upper lift arm 70 about the lateral pitch axis PA (see FIG. 10). However, it is also within the scope of the present invention where the fixed section 116 is alternatively constructed to interconnect the upper lift arms 70. For example the fixed section 116 and upper lift arms 70 could be interconnected by more than two upper arm pivot joints 146. The illustrated fixed section 116 is also preferably attached to the upper lift arms 70 so that the lift arms 70 restrict the fixed section 116 from swinging about the longitudinal axis A1 relative to the lift assembly 24.

Turning to FIGS. 4-13, the swinging section 118 is operable to be mounted pivotally to the fixed section 116. The swinging section 118 broadly includes a weldment 148 and a hinge assembly 150 that serves to connect the weldment 148 to the fixed section 116, as will be discussed. The weldment 148 includes a pair of upright members 152 and an elongated base member 154 that interconnects the upright members 152. The weldment 148 also includes an offset brace 156 that extends laterally between the upright members 152 and is spaced between upper and lower ends of the upright members 152. The offset brace 156 includes center segment 156a and end segments 156b that extend laterally between the upright members 152. The offset brace 156 also includes gusset segments 156c that extend downwardly and outwardly from the center segment 156a to the base member 154.

The weldment 148 further includes lower arm lugs 158 positioned adjacent to ends of the lateral base member 154, with the lower arm lugs 158 projecting forwardly of the lateral base member 154. The weldment 148 further includes upper and lower pairs of boom lugs 160,162 positioned adjacent to corresponding ends of the upright member 152 and projecting rearwardly from the upright member 152 (see FIG. 10). Yet further, the weldment 148 includes pairs of side lugs 164 that support lower mounting pins 166. The mounting pins 166 are positioned outboard of the upright members 152 to support the spring-and-damper assemblies 119. The weldment 148 also includes guide plates 168 attached adjacent corresponding upper ends of the upright members 152 and positioned forwardly of adjacent upper boom lugs 160. As will be discussed in greater detail, the illustrated guide plates 168 present horizontal and vertical guide surfaces configured to engage the fixed section 116 during relative tilting movement between the sections 116,118.

Turning to FIG. 2, the swinging section 118 is removably attached to the boom assembly 22 by connecting lugs 44,46 of connector members 40 to corresponding upper and lower boom lugs 160,162. In particular, the boom support frame 28 is positioned rearwardly of swinging section 118 with lugs 160,162 extending into the slots presented by the connector members 40. Pins 170 are removably inserted through adjacent openings in corresponding lugs 44,46 and lugs 160,162 to preferably provide a rigid connection between the swinging section 118 and boom support frame 28. However, the swinging section 118 could be alternatively attached to the support frame 28 without departing from the scope of the present invention.

Turning again to FIGS. 4-13, the hinge assembly 150 connects the fixed section 116 and the weldment 148 so that the swinging section 118 is generally positioned below and hangs from the fixed section 116. While the illustrated relationship between sections 116,118 could be switched, it is preferable that one of the sections 116,118 is generally above or below the other section 116,118 to minimize the fore and aft extent of the tilt frame 26. The hinge assembly 150 includes a pair of hinge plates 172, upper bushings 174,176, lower bushings 178, and lower fasteners 180 (see FIGS. 7 and 10). The hinge plates 172 are generally L-shaped and each present a pair of integral plate segments 182 that extend from an upper end 184 of the plate 172 to respective lower ends 186 of the plate 172 (see FIGS. 7 and 9). The hinge plates 172 also present upper and lower holes 188,190 adjacent corresponding ends 184, 186, with the upper holes 188 receiving respective upper bushings 174,176 (see FIGS. 7 and 10).

The hinge plates 172 are attached to the tubular body 120 and the offset brace 156 on respective fore and aft sides thereof. The lower ends 186 are attached to the offset brace 156 by inserting lower bushings 178 into corresponding holes in the offset brace 156 and securing the lower ends 186 with lower fasteners 180. The upper end 184 is attached to the tubular body 120 by inserting upper bushings 174,176 into corresponding upper holes 188, and inserting the pin 136 through the bushings 174,176 and the bushing assembly 134, with the pin 136 being secured by a fastener 192 that extends through transverse holes in the bushing 174 and pin 136. In this manner, the sections 116,118 cooperatively form a frame pivot joint 194 that defines a longitudinal frame pivot axis A2 extending along the longitudinal sprayer axis A1. The frame pivot joint 194 permits the swinging section 118 to pivot relative to the fixed section 116 about the longitudinal frame pivot axis A2. Preferably, the frame pivot joint 194 comprises the only direct pivotal connection between sections 116,118, but the tilt frame 26 could be constructed to provide an alternative connection between sections 116,118 (e.g., a four-bar linkage) without departing from the scope of the present invention. As will be discussed further, the frame pivot joint 194, via the bushing assembly 134, permits a limited amount of relative pivotal movement between the sections 116,118 and between the lift assembly 24 and boom assembly 22 about the lateral pitch axis PA.

The fixed and swinging sections 116,118 are preferably constructed so as to be compactly positioned relative to one another, particularly along the longitudinal direction. The illustrated sections 116,118 are preferably constructed so that the swinging section 118 is located below and hangs from the fixed section 116. More preferably, the tilt frame 26 is devoid of any part of the fixed section 116 extending below the hinge assembly 150 to provide this relative positioning of the sections 116,118 and to allow a predetermined amount of swinging movement between sections 116,118. However, the principles of the present invention are applicable where the sections 116,118 are alternatively configured to provide a compact tilt frame construction.

Turning to FIGS. 7-13, the spring-and-damper assembly 119 is conventional and includes a coil spring 195 and a damper 196. Each coil spring 195 and damper 196 present upper and lower ends that are attached to corresponding upper and lower mounting pins 130,166 of the tilt frame 26. In the usual manner, the spring-and-damper assemblies 119 cooperatively dampen and control relative movement between the sections 116,118.

During relative pivotal movement between the sections 116,118 about the frame pivot axis A2, the sections 116,118 present adjacent surfaces that slide relative to one another. The fixed section 116 includes a pair of pads 197 attached to the aft side of respective arm mounting brackets 122 (see FIG. 10). The pads 197 present rearwardly-facing surfaces located alongside respective vertical guide surfaces 198 of guide plates 168, with the pads 197 and guide plates 168 restricting excessive off-axis pivotal movement between the sections 116,118 (see FIGS. 7 and 10).

The fixed section 116 also includes a pair of flexible stops 200 attached to underneath surfaces of respective arm mounting brackets 122, and the stops 200 are located below the lugs 124. The stops 200 are positioned above corresponding horizontal guide surfaces 202 of guide plates 168, with the stops 200 and guide plates 168 restricting relative pivotal movement between the sections 116,118 about the frame pivot axis A2. In particular, the sections 116,118 are operable to pivot relative to one another into and out of an aligned frame position (see FIGS. 5 and 9). The sections 116,118 can pivot out of the aligned frame position and into a tilted frame position (see FIGS. 6 and 12), with the swinging section 118 operable to pivot relative to fixed section 116 through a tilt angle α measured relative to the aligned frame position (see FIGS. 9 and 12). The maximum amount of tilt angle α (i.e., the angle beyond which additional tilting movement would cause damage to the tilt frame 26) for the illustrated tilt frame 26 preferably ranges from about one (1) degree to about ten (10) degrees. More preferably, the maximum amount of tilt angle α ranges from about two (2) degrees to about five (5) degrees and, most preferably, is about three (3) degrees. Because the swinging section 118 is rigidly attached to the support frame 28, the boom assembly 22 is configured to shift between an untilted boom orientation associated with the aligned frame position (see FIG. 5) and a tilted boom orientation associated with the tilted frame position (see FIG. 6).

The swinging section 118 is connected directly to the lift assembly 24 by lower lift arms 72 to restrict relative pivotal movement between the sections 116,118 about the lateral pitch axis PA. The aft ends of lower lift arms 72 are pivotally attached to the swinging section 118 by inserting the aft ball bearing assemblies 108 between lower arm lugs 158 and inserting a pin 204 through each spherical sleeve 112 and through bushings 206 received by openings in the lower arm lugs 158 (see FIG. 13). Thus, the lower lift arms 72, lower arm lugs 158, bushings 206, and pins 204 cooperatively provide lower arm pivot joints 208 that each permit relative pivotal movement between the lower lift arms 72 and swinging section 118 about a lateral pitch axis, and also about a vertical arm pivot axis.

The illustrated base 68, lift arms 70,72 and tilt frame 26 are preferably interconnected in a four-bar linkage configuration that allows the lift assembly 24 to shift the tilt frame 26 and boom assembly 22 along a vertical direction relative to the ground. In particular, the lift arms 70,72 are preferably configured to move between upper and lower lift positions (see FIGS. 1 and 2) while maintaining the tilt frame 26 and the boom assembly 22 in a generally upright orientation.

With the sections 116,118 connected to each other, the illustrated tilt frame 26 is constructed to be compactly positioned relative to the arm pivot joints 146,208 along the longitudinal direction. In particular, the offset brace 156 is constructed to locate the frame pivot joint 194 so that the boom lugs 160,162 are positioned as far as possible in the forward direction relative to the arm pivot joints 146,208. Consequently, the illustrated tilt frame 26 locates weight of the boom assembly 22 closely to the lift assembly 24. In the illustrated embodiment, the arm pivot joints 146,208 cooperatively define an upright plane P, with the frame pivot joint 194 extending fore and aft of the plane P. However, it is also within the ambit of the present invention where the tilt frame 26 is alternatively configured to compactly position the boom assembly 22 relative to the lift assembly 24 (e.g., where fixed section 116 is positioned below swinging section 118).

The lower arm pivot joints 208 permit relative up and down pivotal movement of the lower lift arm 72 relative to the swinging section 118 about the respective vertical arm pivot axes. Moreover, the lower base pivot joints 114 both permit rotation about respective vertical arm pivot axes so that the lower lift arms 72 can swing side-to-side with the swinging section 118. During relative swinging movement between the sections 116,118, the lower lift arms 72 remain connected to the swinging section 118 and restrict off-axis pivotal movement of the swinging section 118 about the lateral pitch axis PA. However, because the lower lift arms 72 present a fixed arm length, the lower lift arms 72 urge the swinging section 118 to pivot slightly about the lateral pitch axis PA during swinging movement. The illustrated bushing assembly 134 has been found to provide sufficient "give" between the sections 116,118 of the tilt frame 26 so that the lower lift arms 72 can remain attached to the section 118 through the disclosed range of swinging movement.

It has also been found that the illustrated connection of lower lift arms 72 to swinging section 118 further permits the compact, vertical arrangement of sections 116,118 relative to each other. In particular, the fixed section 116 and hinge assembly 150 are preferably spaced above the lower arm pivot joints 208 to provide the illustrated configuration of sections 116,118 and also permit attachment of the lower lift arms 72 to the section 118. However, the sections 116,118 and lower lift arms 72 could be alternatively configured to permit swinging movement of section 118.

The lift assembly 24 and tilt frame 26 are configured to support the boom assembly 22 during travel over undulating terrain. During spraying operations, the vehicle and sprayer 20 commonly travel at elevated speeds over undulating terrain, which could cause sudden and sometimes undesirable rolling movement (i.e., movement about the longitudinal axis A1) of the vehicle and sprayer 20. It has been found that the weight of the booms 30 and the distribution of boom weight relative to the longitudinal axis A1 applies extensive loads within the boom assembly 22 and lift assembly 24, particularly when the sprayer 20 is exposed to rolling movement. As the boom assembly 22 swings about the longitudinal axis A1 in response to rolling movement, the swinging section 118 moves with the boom assembly 22 and swings relative to the fixed section 116. The spring-and-damper assemblies 119 of the tilt frame 26 serve to dampen the swinging movement and isolate the lift assembly 24 from some movement of the boom assembly 22. The sections 116,118 are also constructed to limit relative swinging movement so that the sections 116,118 do not exceed the maximum value of tilt angle $\alpha$. As a result, the sections 116,118 limit the maximum vertical displacement of the booms 30 due to swinging of the boom assembly 22 and thereby prevent damage to the booms 30 (e.g., from inadvertent contact between the boom 30 and the ground).

In operation, the tilting boom sprayer 20 is carried by a vehicle and the booms 30 are shiftable between the storage position (not shown) and the operating position. With the booms 30 in the operating position, the vertical position of the boom assembly 22 is also adjustable by moving the lift arms 70,72 of the lift assembly 24 up and down. Thus, the boom assembly 22 and the spray nozzles (not shown) can be precisely located relative to the ground (not shown) to control sprayer coverage. During spraying operation, the sprayer 20 can travel over undulating terrain. The illustrated tilt frame 26 permits the boom assembly 22 to swing about the longitudinal axis relative to the lift assembly 24 when exposed to rolling vehicle movement. The tilt frame 26 also dampens rolling movement of the boom assembly 22 relative to the lift assembly 24. As a result, the tilt frame 26 restricts the sprayer 20 from becoming damaged when traveling over undulating terrain.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A tilting boom applicator comprising:
   a boom support structure;
   a laterally-extending applicator boom;
   first and second lift arms connected to the boom support structure,
   said arms cooperatively supporting the applicator boom on the support structure for relative vertical shifting; and
   a tilt frame,
   said tilt frame including a first frame section mounted to the first lift arm and a second frame section mounted to the applicator boom,
   said first and second frame sections attached to each other at a frame pivot joint that defines a longitudinal tilt axis, with the frame pivot joint permitting tilting movement of the applicator boom about the longitudinal tilt axis, said second lift arm being directly attached to the second frame section and serving to limit movement of the applicator boom about a lateral pitch axis while permitting the tilting movement, said first frame section being attached to the first lift arm and restricted from swinging relative to the first lift arm about the frame pivot joint, said second frame section being positioned below and hung from the first frame section.

2. The tilting boom applicator as claimed in claim 1, said first frame section including an elongated body and a bushing assembly mounted in the elongated body, with the bushing assembly serving as a hinge element, said second frame section presenting another hinge element that is attached to the first-mentioned hinge element with a pin, said hinge elements and pin cooperatively providing the frame pivot joint.

3. The tilting boom applicator as claimed in claim 2, said bushing assembly including a flexible bushing that receives the pin and flexes in response to off-axis loading of the pin caused by movement of the applicator boom relative to the lift about the lateral pitch axis.

4. The tilting boom applicator as claimed in claim 2, said frame pivot joint serving as the only pivotal connection between the first and second frame sections.

5. The tilting boom applicator as claimed in claim 1, said lift arms presenting fore and aft lift arm ends, said aft lift arm ends being pivotally mounted to the tilt frame at respective arm pivot joints.

6. The tilting boom applicator as claimed in claim 5; and a lift that includes the arms and boom support structure, said fore lift arm ends being pivotally mounted to the boom support structure at respective base pivot joints.

7. The tilting boom applicator as claimed in claim 5, said frame pivot joint being spaced laterally between the arm pivot joints to minimize off-axis loading of the frame pivot joint caused by movement of the applicator boom about the lateral pitch axis.

8. The tilting boom applicator as claimed in claim 1, said tilt frame including a spring-and-damper assembly interconnecting the frame sections to dampen any swinging movement between the frame sections.

9. The tilting boom applicator as claimed in claim 8, said spring-and-damper assembly including a pair of coil springs and a pair of dampers, with one coil spring and damper mounted adjacent one end of the tilt frame and another coil spring and damper mounted adjacent another end of the tilt frame.

10. A tilting boom applicator comprising:

a laterally-extending applicator boom;

a lift supporting the applicator boom and operable to vertically shift the applicator boom, said lift including a first lift arm and a second lift arm extending longitudinally relative to the applicator boom; and a tilt frame interconnecting the applicator boom and lift, said tilt frame including a first frame section mounted to the first lift arm and a second frame section mounted to the applicator boom, said first and second frame sections attached to each other at a frame pivot joint that defines a longitudinal tilt axis, with the frame pivot joint permitting tilting movement of the applicator boom relative to the lift about the longitudinal tilt axis, said second lift arm being directly attached to the second frame section and serving to limit movement of the applicator boom relative to the lift about a lateral pitch axis while permitting the tilting movement, said first frame section being attached to the first lift arm and restricted from swinging relative to the first lift arm about the frame pivot joint, said second frame section being positioned below and hung from the first frame section, said first frame section including a hinge element that presents a hinge opening aligned with the longitudinal tilt axis, said second frame section including a hinge assembly removably attached to a remainder of the second frame section, said hinge assembly presenting a hinge bore, with the hinge bore and opening cooperatively receiving a pin that pivotally connects the frame sections, said tilt frame being devoid of any part of the first frame section below the hinge assembly.

11. The tilting boom applicator as claimed in claim 10, said second lift arm being positioned below the first lift arm, said second lift arm presenting fore and aft ends, said aft lift arm end being pivotally mounted to the tilt frame at a lift pivot joint, with the hinge assembly being spaced above the lift pivot joint to permit cooperative swinging movement of the second frame section and the lower lift arm.

12. The tilting boom applicator as claimed in claim 10, said hinge assembly comprising a pair of hinge plates that cooperatively present the hinge opening and are positioned respectively fore and aft of the hinge element of the first frame section.

13. A tilting boom applicator comprising:

a laterally-extending applicator boom;

a lift supporting the applicator boom and operable to vertically shift the applicator boom, said lift including a first lift arm and a second lift arm extending longitudinally relative to the applicator boom; and a tilt frame interconnecting the applicator boom and lift, said tilt frame including a first frame section mounted to the first lift arm and a second frame section mounted to the applicator boom, said first and second frame sections attached to each other at a frame pivot joint that defines a longitudinal tilt axis, with the frame pivot joint permitting tilting movement of the applicator boom relative to the lift about the longitudinal tilt axis, said second lift arm being directly attached to the second frame section and serving to limit movement of the applicator boom relative to the lift about a lateral pitch axis while permitting the tilting movement, said lift arms presenting fore and aft lift arm ends, said aft lift aim ends being pivotally mounted to the tilt frame at respective arm pivot joints, said lift including a base, said fore lift arm ends being pivotally mounted to the base at respective base pivot joints, said arm pivot joint of the lower lift arm comprising a ball joint that permits relative pivotal movement between the lower lift arm and tilt frame about orthogonal axes, with swinging movement of the tilt frame and lower lift arm causing movement of the applicator boom relative to the lift about the lateral pitch axis.

14. The tilting boom applicator as claimed in claim 13,
said base pivot joint of the lower lift arm comprising another ball joint that permits relative pivotal movement between the lower lift arm and base about orthogonal axes.

15. The tilting boom applicator as claimed in claim 13,
said first frame section including an elongated body and a bushing assembly mounted in the elongated body, with the bushing assembly serving as a hinge element,
said second frame section presenting another hinge element that is attached to the first-mentioned hinge element with a pin,
said hinge elements and pin cooperatively providing the frame pivot joint,
said bushing assembly including a flexible bushing that receives the pin and flexes in response to off-axis loading of the pin caused by movement of the applicator boom relative to the lift about the lateral pitch axis.

16. The tilting boom applicator as claimed in claim 15,
said arm pivot joints presenting lateral joint axes spaced vertically from each other to cooperatively define an upright plane,
said frame pivot joint extending fore and aft of the upright plane to compactly position the applicator boom relative to the lift.

17. A tilting boom applicator comprising:
a boom support structure;
a laterally-extending applicator boom;
first and second lift arms connected to the boom support structure,
said arms cooperatively supporting the applicator boom on the support structure for relative vertical shifting; and
a tilt frame,
said tilt frame including a first frame section mounted to the first lift arm and a second frame section mounted to the applicator boom,
said first and second frame sections attached to each other at a frame pivot joint that defines a longitudinal tilt axis, with the frame pivot joint pen titling tilting movement of the applicator boom about the longitudinal tilt axis,
said second lift arm being directly attached to the second frame section and serving to limit movement of the applicator boom about a lateral pitch axis while permitting the tilting movement,
said first frame section including an elongated body and a bushing assembly mounted to the elongated body, with the bushing assembly serving as a hinge element,
said second frame section presenting another hinge element that is attached to the first-mentioned hinge element with a pin,
said bushing assembly including a flexible bushing that receives the pin and flexes in response to off-axis loading of the pin caused by movement of the applicator boom about the lateral pitch axis.

18. The tilting boom applicator as claimed in claim 17,
said flexible bushing including a pair of inner and outer sleeves, with the inner sleeve extending within the outer sleeve,
said flexible bushing including an elastomeric sleeve between and interconnecting the inner and outer sleeves, with the elastomeric sleeve permitting relative movement between the inner and outer sleeves about the lateral pitch axis.

19. The tilting boom applicator as claimed in claim 17,
said lift arms presenting fore and aft lift arm ends,
said aft lift aim ends being pivotally mounted to the tilt frame at respective arm pivot joints.

20. The tilting boom applicator as claimed in claim 19; and
a lift that includes the arms and boom support structure,
said fore lift arm ends being pivotally mounted to the boom support structure at respective base pivot joints.

21. A tilting boom applicator comprising:
a laterally-extending applicator boom;
a lift supporting the applicator boom and operable to vertically shift the applicator boom,
said lift including a first lift arm and a second lift arm extending longitudinally relative to the applicator boom; and
a tilt frame interconnecting the applicator boom and lift,
said tilt frame including a first frame section mounted to the first lift arm and a second frame section mounted to the applicator boom,
said first and second frame sections attached to each other at a frame pivot joint that defines a longitudinal tilt axis, with the frame pivot joint permitting tilting movement of the applicator boom relative to the lift about the longitudinal tilt axis,
said second lift arm being directly attached to the second frame section and serving to limit movement of the applicator boom relative to the lift about a lateral pitch axis while permitting the tilting movement,
said first frame section including an elongated body and a bushing assembly mounted to the elongated body, with the bushing assembly serving as a hinge element,
said second frame section presenting another hinge element that is attached to the first-mentioned hinge element with a pin,
said bushing assembly including a flexible bushing that receives the pin and flexes in response to off-axis loading of the pin caused by movement of the applicator boom relative to the lift about the lateral pitch axis,
said lift arms presenting fore and aft lift arm ends,
said aft lift arm ends being pivotally mounted to the tilt frame at respective arm pivot joints,
said lift including a base,
said fore lift arm ends being pivotally mounted to the base at respective base pivot joints,
said arm pivot joint of the lower lift arm comprising a ball joint that permits relative pivotal movement between the lower lift arm and tilt frame about orthogonal axes, with swinging movement of the tilt frame and lower lift arm causing movement of the applicator boom relative to the lift about the lateral pitch axis.

22. The tilting boom applicator as claimed in claim 21,
said base pivot joint of the lower lift arm comprising another ball joint that permits relative pivotal movement between the lower lift arm and base about orthogonal axes.

23. A tilting boom applicator comprising:
a laterally-extending applicator boom;
a lift supporting the applicator boom and operable to vertically shift the applicator boom,
said lift including a first lift arm and a second lift arm extending longitudinally relative to the applicator boom; and
a tilt frame interconnecting the applicator boom and lift,
said tilt frame including a first frame section mounted to the first lift arm and a second frame section mounted to the applicator boom,
said first and second frame sections attached to each other at a frame pivot joint that defines a longitudinal tilt axis, with the frame pivot joint permitting tilting movement of the applicator boom relative to the lift about the longitudinal tilt axis, said second lift arm being directly attached to the second frame section and serving to limit movement of the applicator boom relative to the lift about a lateral pitch axis while permitting the tilting movement, said lift arms presenting fore and aft lift arm ends, said aft lift arm ends being pivotally mounted to the tilt frame at respective aim pivot joints, said lift including a base, said fore lift arm ends being pivotally mounted to the base at respective base pivot joints, said second lift arm being positioned below the first lift arm.

24. The tilting boom applicator as claimed in claim 23, said lift arms each presenting a corresponding fixed length.

25. The tilting boom applicator as claimed in claim 24, said first frame section including an elongated body and a bushing assembly mounted in the elongated body, with the bushing assembly serving as a hinge element, said second frame section presenting another hinge element that is attached to the first-mentioned hinge element with a pin, said hinge elements and pin cooperatively providing the frame pivot joint, said fixed length lift arms causing limited movement of the applicator boom relative to the lift about the lateral pitch axis in response to relative swinging movement between the applicator boom and lift, said bushing assembly including a flexible bushing that receives the pin and flexes in response to off-axis loading of the pin caused by movement of the applicator boom relative to the lift about the lateral pitch axis.

26. The tilting boom applicator as claimed in claim 24, said lift including a third lift arm and a fourth lift aim extending longitudinally relative to the applicator boom, said first frame section being attached to the first and third lift arms and restricted from swinging relative to the first and third lift arms about the frame pivot joint, said second frame section being positioned below and hung from the first frame section.

27. The tilting boom applicator as claimed in claim 26, said second and fourth lift arms being positioned below the first and third lift arms, said second and fourth lift arms presenting fore and aft ends, said aft lift arm ends of the second and fourth lift arms being pivotally mounted to the tilt frame at lift pivot joints, with the frame pivot joint being spaced above the lift pivot joints to permit cooperative swinging movement of the second frame section and the lower lift arms.

* * * * *

UNITED STATES PATENT AND TRADEMARK OFFICE
CERTIFICATE OF CORRECTION

PATENT NO. : 8,464,967 B2
APPLICATION NO. : 12/636455
DATED : June 18, 2013
INVENTOR(S) : Kuphal et al.

It is certified that error appears in the above-identified patent and that said Letters Patent is hereby corrected as shown below:

On the title page item 75 the inventor name listed on the face of the issued patent as "Steve Suebert" should be changed to --Steve Seubert--.

Signed and Sealed this
Twenty-second Day of October, 2013

Teresa Stanek Rea
*Deputy Director of the United States Patent and Trademark Office*